United States Patent [19]
Lennen

[11] Patent No.: US 6,278,745 B1
[45] Date of Patent: *Aug. 21, 2001

(54) RECEIVER HAVING A MEMORY BASED SEARCH FOR FAST ACQUISITION OF A SPREAD SPECTRUM SIGNAL

(75) Inventor: Gary R. Lennen, Cupertino, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/559,893

(22) Filed: Apr. 26, 2000

Related U.S. Application Data

(63) Continuation of application No. 08/936,379, filed on Sep. 25, 1997, now Pat. No. 6,091,785.

(51) Int. Cl.[7] .............................. H03K 9/00; H04L 27/06; H04L 27/16; H04L 27/22
(52) U.S. Cl. ........................... 375/316; 375/326; 375/368
(58) Field of Search ........................... 375/376, 80, 116, 375/115, 316, 326, 368; 342/357

(56) References Cited

U.S. PATENT DOCUMENTS

| | | | |
|---|---|---|---|
| 3,919,479 | 11/1975 | Moon et al. | 179/1 SB |
| 4,426,712 | 1/1984 | Gorski-Popiel | 375/96 |
| 4,653,076 | 3/1987 | Jerrim et al. | 375/115 |
| 4,800,577 | 1/1989 | Tachita et al. | 375/340 |
| 4,860,323 | 8/1989 | Malter | 375/111 |
| 5,046,074 | 9/1991 | Abiven et al. | 375/111 |
| 5,170,415 | 12/1992 | Yosida et al. | 375/326 |
| 5,289,391 | 2/1994 | Ibrahim et al. | 364/570 |
| 5,297,185 | 3/1994 | Best et al. | 375/368 |
| 5,343,497 | 8/1994 | Canosi et al. | 375/111 |
| 5,420,593 | 5/1995 | Niles | 342/357.12 |
| 5,594,453 | 1/1997 | Rodal et al. | 342/357 |
| 5,629,708 | 5/1997 | Rodal et al. | 342/357 |

Primary Examiner—Stephen Chin
Assistant Examiner—Tony Al-Beshrawi
(74) Attorney, Agent, or Firm—David R. Gildea

(57) ABSTRACT

A GPS receiver having a fast time to lock to a GPS signal by storing a time period of an incoming GPS signal in a signal memory and rapidly comparing the signal memory against locations in a replica memory having stored GPS signal replicas. The GPS receiver includes a memory-based search engine for acquiring the GPS signal so that it may be tracked. The memory-based search engine includes a signal memory for storing a millisecond of a digitized GPS signal, a replica memory section for storing replicas representative of the digitized GPS signal for all possible frequency differences between the GPS carrier frequency and a local reference frequency and phase offsets between the GPS code phase and a local reference time, and a GPS memory comparator for comparing the stored signal in signal memory to the stored replicas in replica memory and issuing an acquisition detection signal when the level of the comparison is greater than a selected threshold.

20 Claims, 13 Drawing Sheets

2

RECEIVER HAVING A MEMORY BASED SEARCH FOR FAST ACQUISITION OF A SPREAD SPECTRUM SIGNAL

A continuation application of U.S. Ser. No. 08/936,379 filed 09/25/97, now U.S. Pat. No. 6,091,785.

BACKGROUND OF THE INVENTION

1. Field of the Invention

The invention relates generally to spread spectrum receivers and more particularly to a GPS receiver and a method using memory comparisons to achieve a fast acquisition of a GPS signal.

2. Description of the Prior Art

When first locking to a global positioning system (GPS) signal, a GPS receiver contains uncertainties as to the exact carrier frequency and code phase transmitted from any particular GPS satellite. The carrier frequency uncertainty is due to the unknown difference in frequency between the clock in the GPS receiver and the clock in the particular GPS satellite and the Doppler frequency shift due to their relative motion. The code phase uncertainty is due to the unknown time offset between the GPS receiver and the particular GPS satellite. In order to acquire the GPS signal and achieve lock on the GPS signal, the GPS receiver must resolve both of these uncertainties.

Typical existing GPS receivers perform a trial and error search algorithm in which a code tracking module generates a replica code signal based upon an assumption of the GPS carrier frequency, typically termed a frequency bin, and the GPS code phase; and compares the replica signal to the incoming GPS signal over a period of the GPS code. If the replica and the incoming GPS signal match, the GPS signal is said to have been acquired. If they do not match, the replica code is shifted by one chip and compared again until all possible code phases have been tried. If match has been found after all code phases have been tried, the frequency bin is changed and the code phase shifting and replica comparisons are performed again, and so on until a match is finally found or the GPS receiver concludes that the GPS satellite having that code is not visible. Because each incoming C/A code period is one millisecond long and there are 1023 possible code phases it take about one second to search through all code phases. A typical GPS receiver may require forty frequency bins resulting in a total of about forty seconds to search the GPS signal for a single GPS. There are thirty-two GPS satellites so the total time to acquire and lock to the GPS signal from one GPS satellite may be several minutes. This is considerably longer than is desirable for some GPS applications. For example, when first turned on or when coming out of a tunnel or a parking garage, a GPS receiver having a fast time to first fix begins providing useful information sooner than a slower GPS receiver. Or, a battery operated GPS receiver having a fast time to first fix will operated longer on its battery than a slower GPS receiver. Existing GPS receivers increase the speed of GPS signal acquisition by using multiple replica signals generated in parallel. However, such parallel processing increases expense and power consumption.

Once the GPS receiver acquires and locks to one GPS satellite the number of frequency bins that must be searched to acquire and lock to the GPS signal from additional GPS satellites is reduced because the carrier frequency from the first GPS satellite may now be used as the frequency reference in the GPS receiver. Once the GPS signal from four or more GPS satellites are acquired and locked, a first fix for a GPS-based location and time is derived from information in the GPS signal.

Several workers have developed schemes to improve the time to first fix. For example, Rodal et al. in U.S. Pat. No. 5,594,453 describes a GPS receiver having a rapid acquisition of GPS satellite signals and in 5,629,708 describes a GPS receiver having an initial adjustment for compensating for drift in reference frequency. Niles in U. S. Pat. No. 5,420,593 describes a method and apparatus for accelerating code correlation searches in initial acquisition and Doppler and code phase in re-acquisition of GPS satellite signals. However, there continues to be a need to improve time to first fix by reducing the time to acquire to the GPS satellite signal.

BRIEF SUMMARY OF THE INVENTION

It is therefore an object of the present invention to provide a receiver having a fast time to acquire a desired incoming signal by storing and then comparing a certain time period of an incoming signal to stored replicas of the desired signal having modulations of the desired signal, likely modulation phase differences between the desired signal and local receiver clocks, and likely carrier frequency differences between the desired signal and the local receiver clocks; and then adjusting the local receiver clocks according to the particular stored replica that matches the stored period of the incoming signal.

Briefly, in a preferred embodiment, a spread spectrum receiver stores and compares a single period of the repeating spreading code of a digitized incoming signal to stored digital replicas of the desired signal having all desired spreading codes and all likely code phase and carrier frequency differences between the desired signal and the local receiver clocks. The stored incoming signal period is played against the stored replicas until a match is detected. Acquisition of the incoming signal is achieved by adjusting phase and frequency of the local receiver clocks according to the particular stored replica that matches of the incoming signal.

A GPS receiver of the present invention includes an antenna for receiving a GPS signal, a filter/LNA for filtering and amplifying the GPS signal received by the antenna, a downconverter for frequency downconverting the filtered and amplified GPS signal, an intermediate frequency (IF) processor for digitizing the downconverted signal, a synthesizer for generating local oscillator signals for the downconverter and IF processor and providing frequency and time references, a C/A code tracking module for tracking the GPS signal once it has been acquired, a microprocessor system for interfacing and controlling the elements of the GPS receiver, and a memory-based search engine for acquiring the GPS signal so that it may be tracked. The memory-based search engine includes a signal memory, a replica memory, and a GPS memory comparator. The signal memory stores one millisecond of the digitized GPS signal. The replica memory stores replicas representative of one millisecond of the digitized GPS signal where the replicas have the pseudorandom (prn) codes for the GPS system for all phase offsets in increments of one chip between the time for the GPS code phase and the reference time and all likely frequency differences in increments of one kilohertz between the GPS carrier frequency and the reference frequency. The GPS memory comparator compares the stored signal in signal memory to the stored replicas in the replica memory and issues an acquisition detection signal when the level of the comparison is greater than a selected threshold. Information for the particular replica that causes the acquisition signal is then used by the microprocessor system to adjust the frequency and time references in the C/A code tracking module to match the frequency and time of the incoming GPS signal, thereby acquiring the GPS signal.

An advantage of a GPS receiver of the present invention is that a GPS signal is acquired at least an order of magnitude more rapidly than it is acquired in a GPS receiver using the traditional method of comparing a single phase and frequency of a GPS replica to one millisecond of the incoming GPS signal, shifting the phase or frequency and comparing to the next millisecond of the GPS signal, and so on until a match is found.

These and other objects and advantages of the present invention will no doubt become obvious to those of ordinary skill in the art after having read the following detailed description of the preferred embodiments which are illustrated in the various figures.

DETAILED DESCRIPTION OF THE INVENTION

Figure 1:
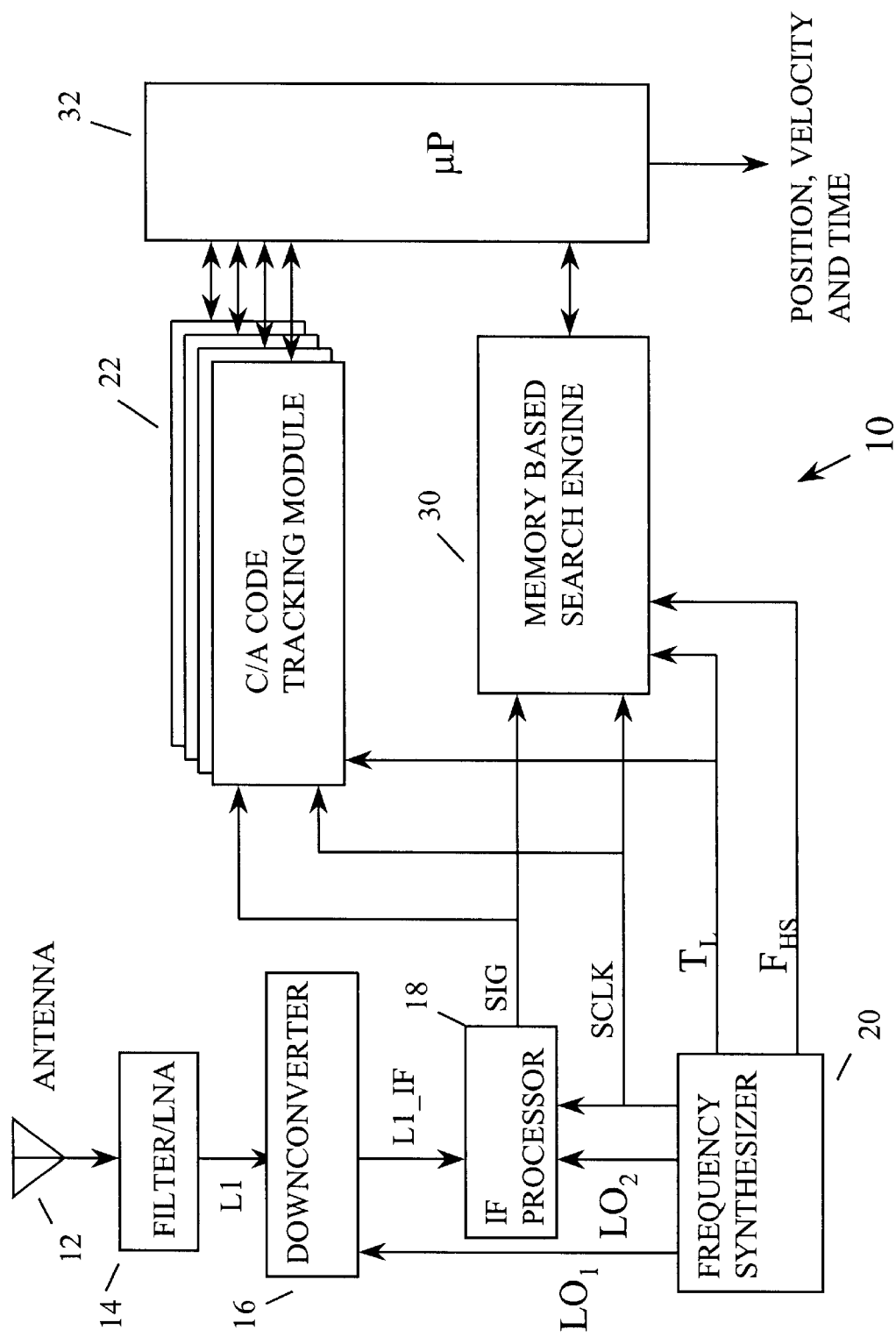

FIG. 1 is a block diagram of a (global positioning system) GPS receiver of the present invention referred to by the general reference number 10. The GPS receiver 10 receives a GPS signal through an antenna 12 capable of operating at a GPS frequency of 1575.42 GHz. The GPS signal has a carrier frequency and a code having a reference time. The antenna 12 passes the GPS signal to a filter/LNA 14 for bandpass filtering about the GPS frequency and amplification. The filtered, amplified GPS signal, shown as L1 in FIG. 1, is then frequency translated in a downconverter 16 using a first local oscillator signal ($LO_1$) to an intermediate frequency (IF) GPS signal, shown as L1_IF. An IF processor 18 uses a second local oscillator signal ($LO_2$) for a second frequency translation to a lower frequency (LF) GPS signal and a sampling clock signal (SCLK) for digitizing the LF GPS signal and issuing a digitized GPS signal (SIG). The $LO_1$, $LO_2$, and SCLK signals; and a local time signal ($T_L$) and a high frequency sampling signal ($F_{HS}$) are generated by a frequency synthesizer 20 using a single reference frequency. The IF processor 18 passes the digitized GPS signal SIG to one or more C/A code tracking modules collectively shown as 22 and a memory-based search engine 30. The C/A code tracking modules 22 use the sampling clock SCLK and $T_L$ signals in traditional methods of tracking the GPS signal from one or more GPS satellites once the GPS signal has been acquired by the memory-based search engine 30. The memory-based search engine 30 uses the sampling clock SCLK and the high frequency clock FHS signals in methods of the present invention described herein to rapidly acquire the GPS signal to achieve a faster time to first fix. The C/A code tracking modules 22 and the memory-based search engine 30 communicate with a microprocessor system (μP) 32. The microprocessor system 32 operates in a conventional manner to process information and to control and receive data from the elements of the GPS receiver 10 with control/data signals. Using the control/data signals, the microprocessor system 32 receives information from the memory-based search engine 30 that is used for adjusting the C/A tracking modules 22 to lock to and track the GPS signal.

Figure 2:
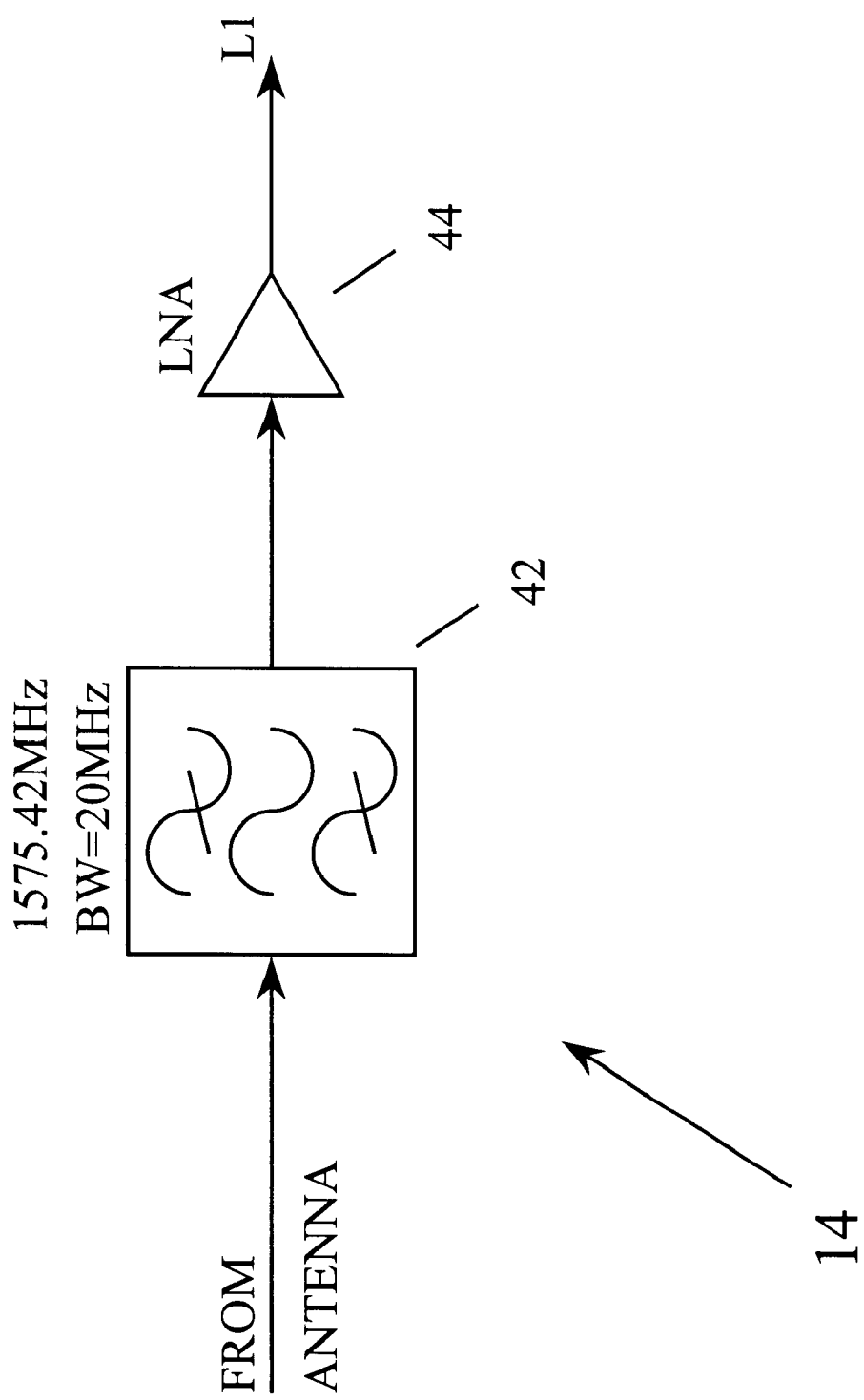

FIG. 2 is a block diagram of the filter/LNA 14 of the present invention. The GPS signal from the antenna 12 is filtered with a bandwidth of twenty megahertz by a bandpass filter 42 and amplified by a low noise amplifier (LNA) 44 to provide the GPS signal L1. The LNA 44 has enough gain such that it sets the noise figure of the GPS receiver 10 independent of the amplifiers and other components that follow.

Figure 3:
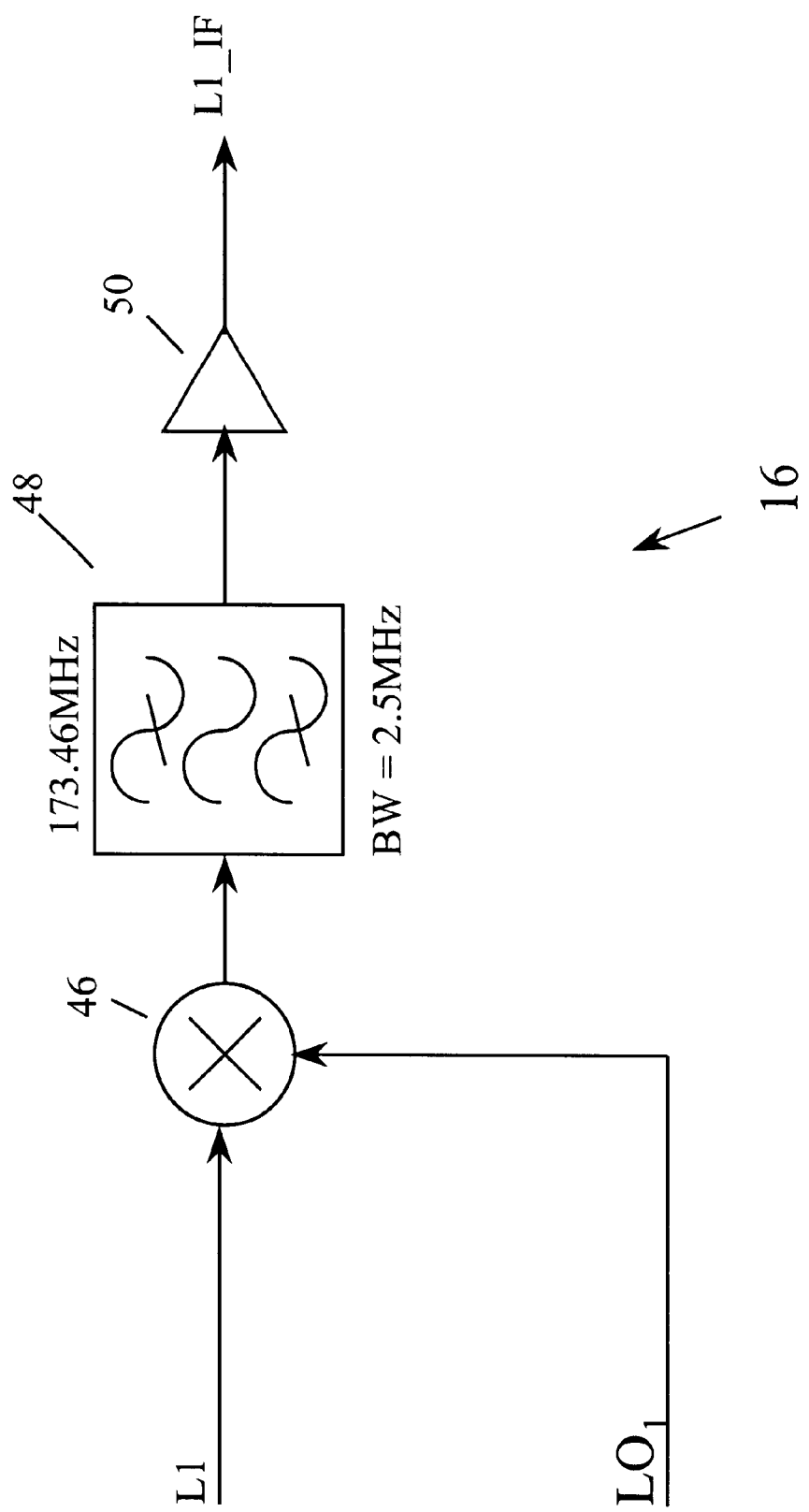

FIG. 3 is a block diagram of the downconverter 16 of the present invention. The following detailed descriptions use specific numerical examples and frequencies. However, it will by appreciated by someone having ordinary skill in the art that other numbers and frequencies may equally well be used within the spirit of the present invention. A mixer 46 uses the first local oscillator signal $LO_1$, to frequency translate the GPS signal L1 to a center frequency of 173.46 megahertz and passes a mixer output signal to a bandpass filter 48. In a preferred embodiment described below, the filter 48 filters the mixer output signal at a nominal center frequency of 173.46 megahertz with a bandwidth of 2.5 megahertz and passes the filtered signal to an amplifier 50. The amplifier 50 amplifies the filtered signal and issues the IF GPS signal L1_IF.

Figure 4:
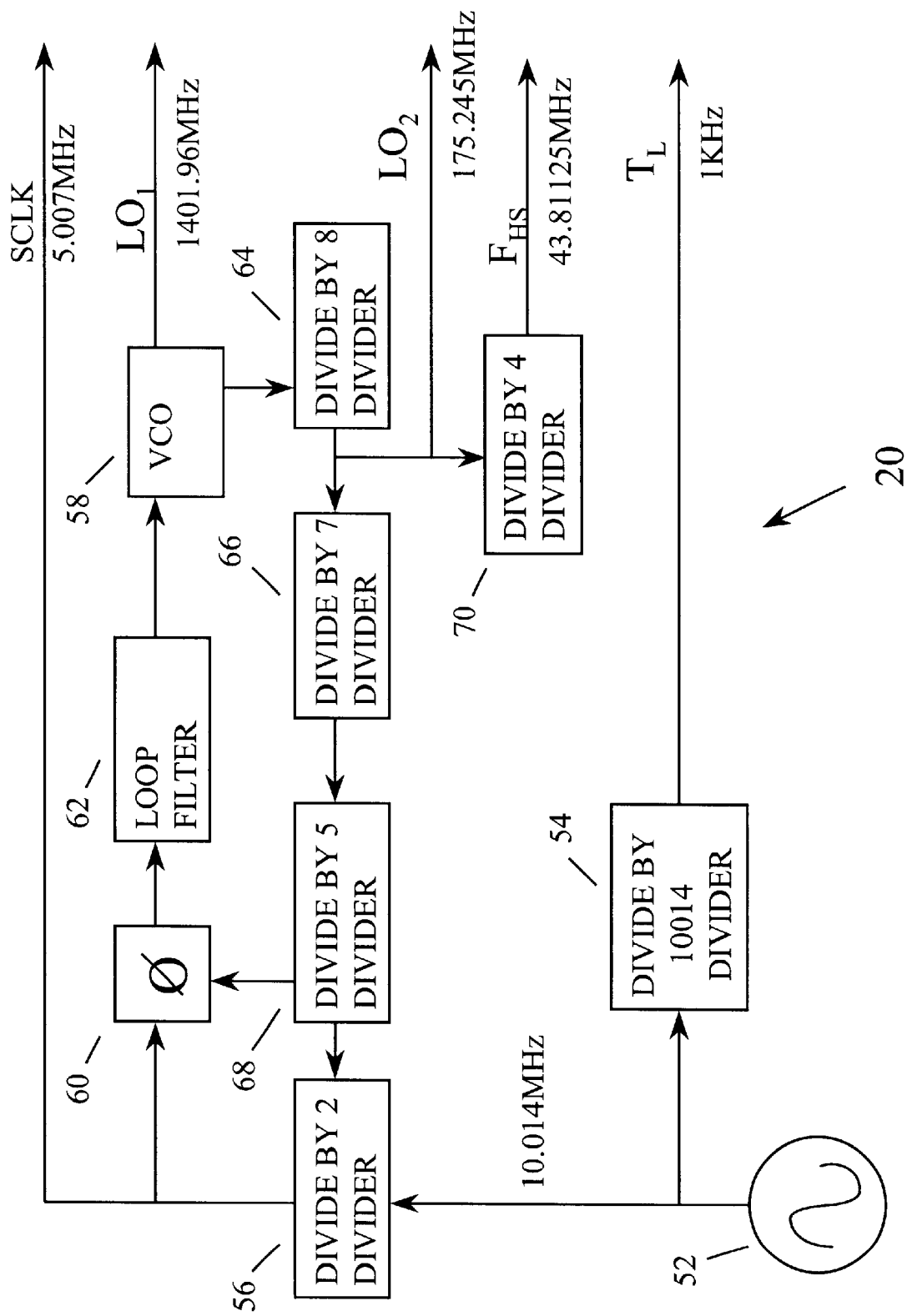

FIG. 4 is a block diagram of the frequency synthesizer 20 of the present invention. A high frequency sampling clock signal $F_{HS}$ used in the GPS signal acquisition has a frequency of 43.81125 megahertz as a trade-off between the current cost of high speed electrical components, especially memory chips, and the acquisition speed. A higher frequency for the high frequency sampling clock $F_{HS}$ would increase the speed of the time to acquire the GPS signal. The reference frequency for the frequency synthesizer 20 is provided by a reference oscillator 52 operating at 10.014 megahertz. In a preferred embodiment, the reference oscillator 52 uses a low-cost crystal as a resonator element. The frequency drift of the reference oscillator 52 contributes to the frequency range or window that must be searched in order to lock to the frequency of the GPS signal. Improving the frequency stability of the reference oscillator 52 decreases the size of the frequency search window and thereby improves (decreases) the time to lock to the GPS signal. However, such improvement typically increases the cost of the reference oscillator 52.

The reference frequency is divided by a divide-by-10014 divider 54 to provide the local time signal $T_L$ having a frequency of one kilohertz and a period of one millisecond which is used as a time reference signal. The reference frequency is also divided by a divide-by-2 divider 56 to provide the sampling clock SCLK at 5.007 megahertz and for locking a voltage controlled oscillator (VCO) 58 to the reference oscillator 52 in a phase lock loop. The phase lock loop includes a phase detector (Ø) 60, a loop filter 62, a divide-by-8 divider 64, a divide by-7 divider 66, a divide-by-5 divider 68, and the VCO 58. The phase lock loop operates in a conventional manner. The VCO 58 operates at a nominal frequency of 1401.96 megahertz and when the loop is locked will be phase coherent with the sampling clock SCLK. An output of the VCO 58 at about 1401.96 megahertz forms the first local oscillator signal $LO_1$. Another or the same output is divided in the divide by-8 divider 64 to form the second local oscillator signal $LO_2$ at 175.245 megahertz. The output of the divide-by-8 divider 64 is further divided in a divide-by-4 divider 70 to provide the high frequency sampling signal $F_{HS}$ at 43.81125 megahertz.

Figure 5:
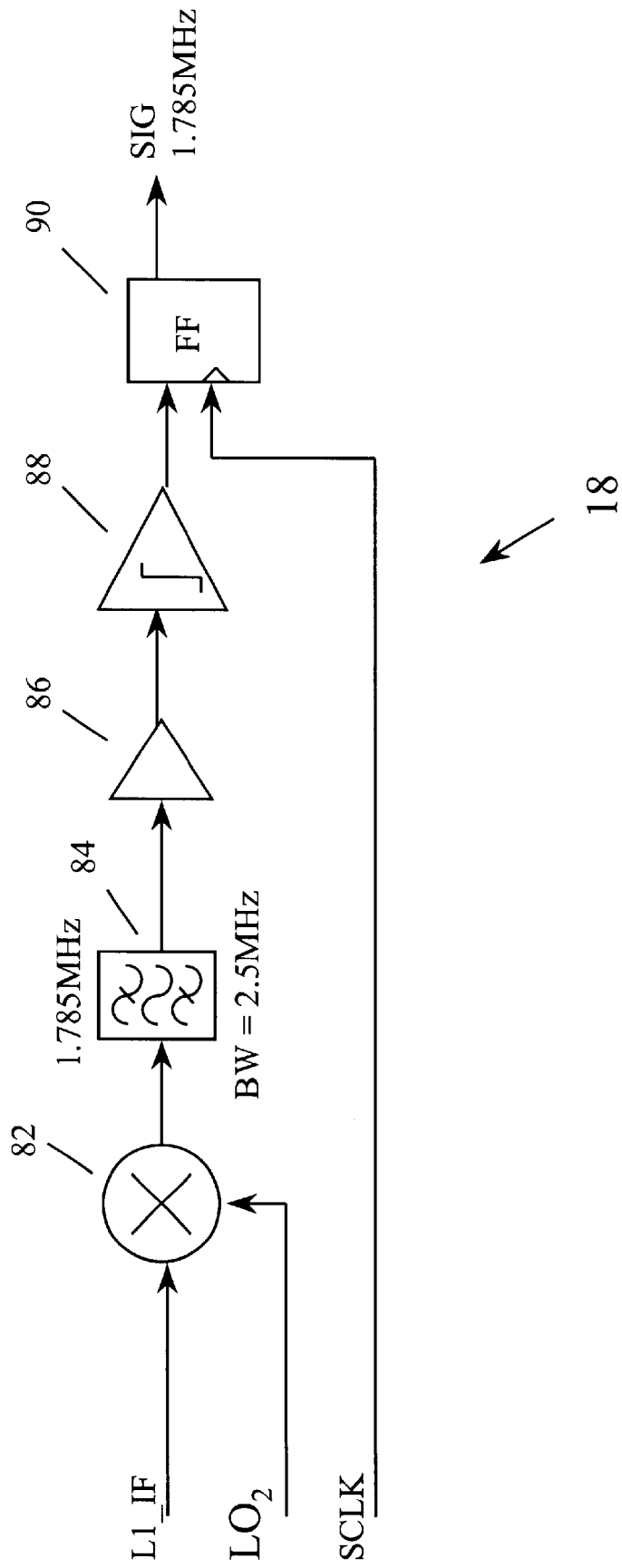

FIG. 5 is a block diagram of the IF processor 18 of the present invention. A mixer 82 uses the local oscillator signal $LO_2$ to frequency translate the IF GPS signal L1_IF to the LF GPS signal at a frequency of 1.785 megahertz. The LF GPS signal is then filtered by a filter 84 having a nominal center frequency of 1.785 megahertz and a bandwidth of 2.5 megahertz. The filtered LF GPS signal is amplified by an amplifier 86 and then hard limited by a limiter/amplifier 88. The hard limited LF GPS signal is then sampled by the sampling clock signal SCLK in a sampler (FF) 90. The sampler 90 may be a flip-flop circuit. The samples from the output of the sampler 90 form the digital GPS signal SIG.

Figure 6:
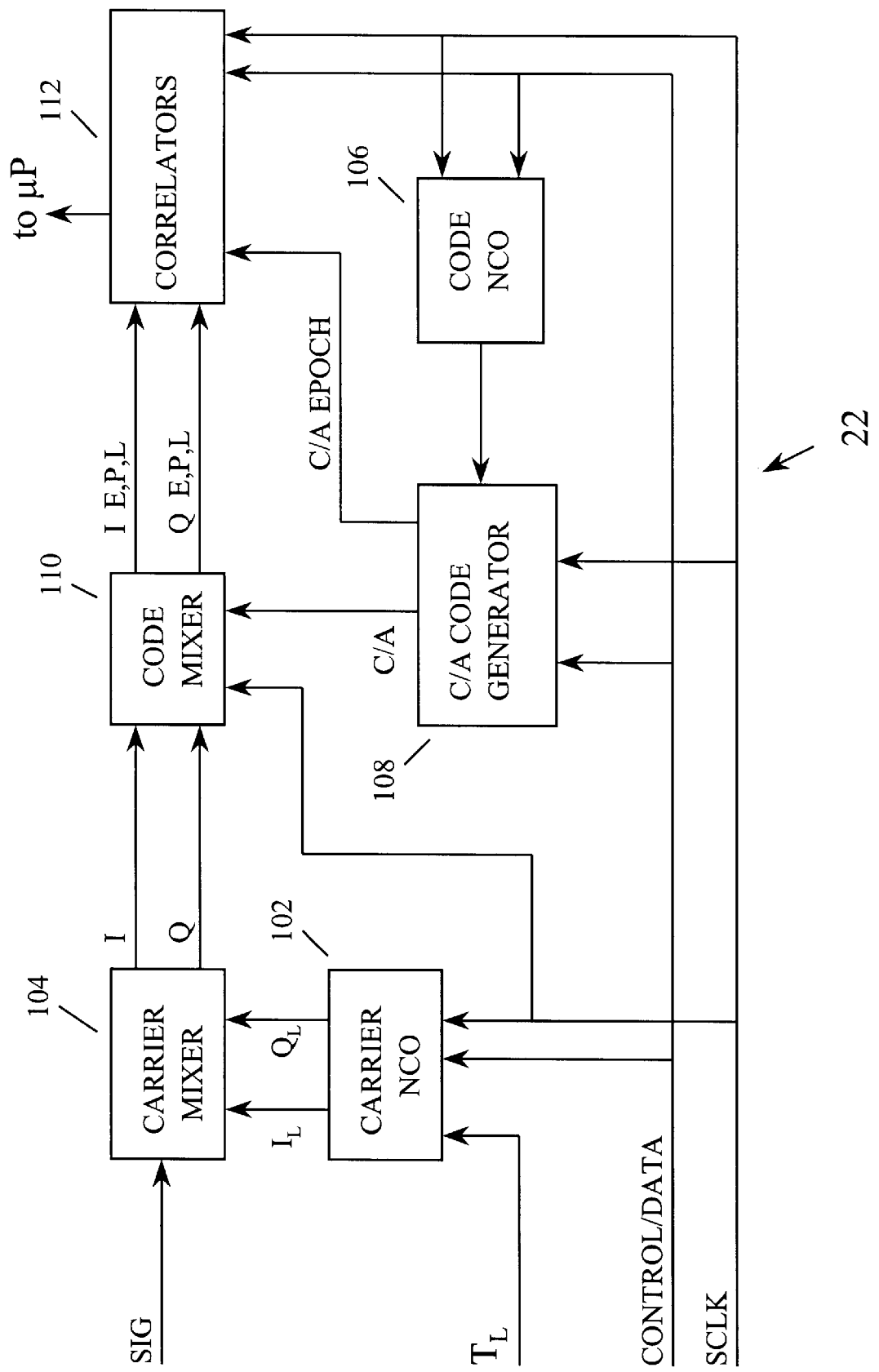

FIG. 6 is a block diagram of the C/A code tracking modules 22 of the present invention. The number of modules is typically between one and twelve where more modules typically provide better performance in the GPS receiver 10 and fewer modules provide lower cost. A carrier numerically controlled oscillator (NCO) 102 receives the local time signal TL, the sampling clock signal SCLK, and the control/data signal; and provides a local in phase ($I_L$) and quadrature phase ($Q_L$) signals. A carrier mixer 104 uses the inphase $I_L$ and quadrature phase QL signals to frequency translate the samples of the digital GPS signal SIG to inphase (I) and quadrature phase (Q) GPS signals based about a frequency of zero Hertz. A code NCO 106 receives the sampling clock signal SCLK and control/data signal to provide a code timing signal to a C/A code generator 108. The C/A code generator 108 receives the control/data signal and synchronizes to the code timing signal and the sampling clock signal SCLK to generate a local signal copy of the C/A code from a desired GPS satellite. A code mixer 110 mixes the inphase I and quadrature phase Q GPS signals from the carrier mixer 104 with the local C/A code signal at three time points to provide a code mixer output signals having GPS information designated as early (E), prompt (P), and late (L) for each of the inphase I and quadrature phase GPS signals. One or more correlators 112 integrates each of the code mixer output signals and provides the integrated signals as correlator output signals. Periodically the microprocessor system 32 reads the correlator output signals and writes the control/data signals to adjust the carrier NCO 102, the code NCO 106, and the C/A code generator 108 to track the GPS signal.

Figure 7:
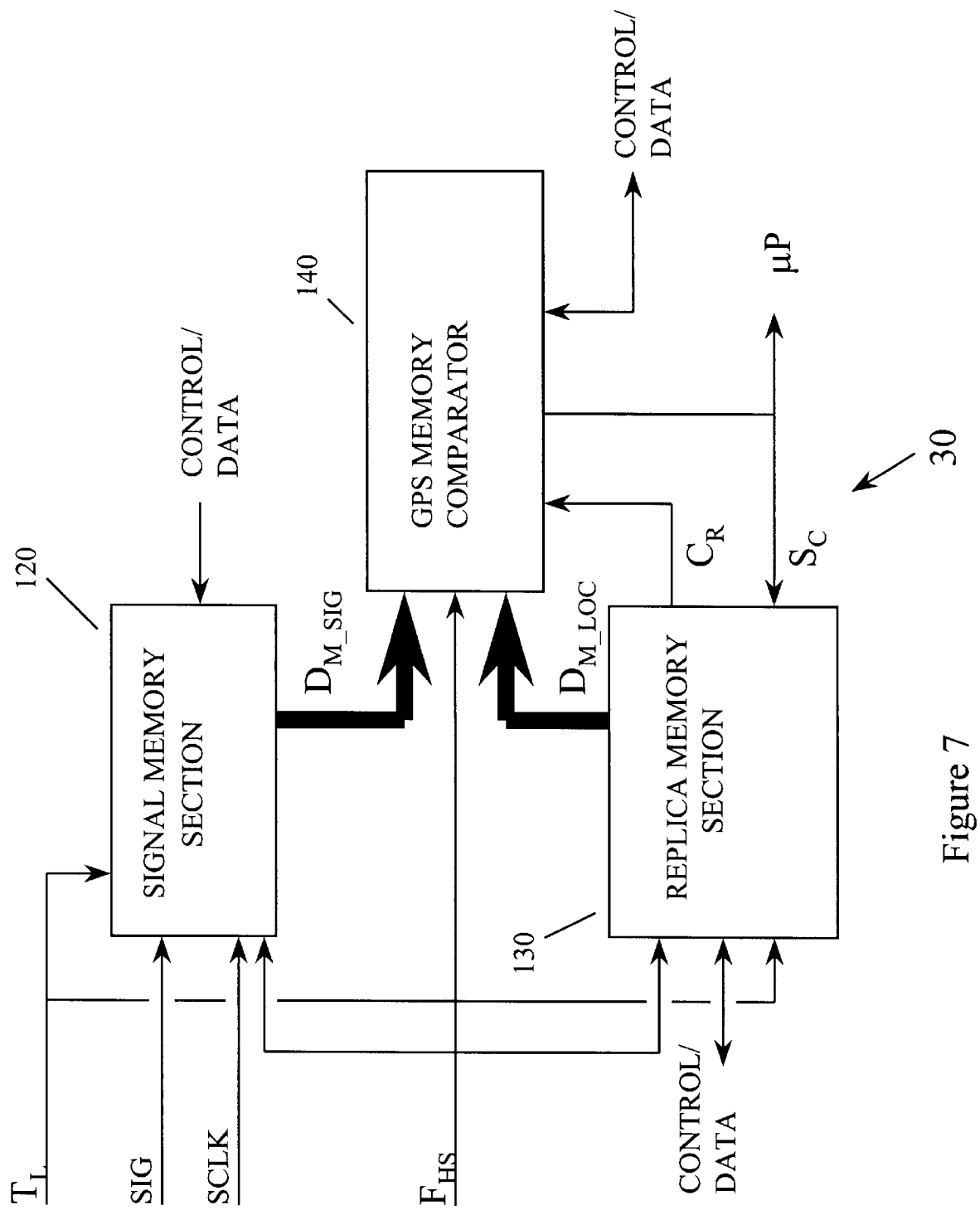
FIG. 7 is a block diagram of a memory-based search engine for the GPS receiver of FIG. 1.

FIG. 7 is a block diagram of the memory-based search engine 30 of the present invention. The memory-based search engine 30 includes a signal memory section 120, a replica memory section 130, and a GPS memory comparator 140. The signal memory section 120 communicates via the control/data signals with the microprocessor system ($\mu$P) 32, receives the sampling clock SCLK, the high frequency clock $F_{HS}$ and the local time signal $T_L$, and stores the samples of the digitized GPS signal SIG over a period given by the local time signal $T_L$, one millisecond in a preferred embodiment, such that the samples are available for rapid processing. The replica memory section 130 receives the high frequency clock $F_{HS}$ and communicates via the control/data signals with the microprocessor system ($\mu$P) 32 for storing local versions of all possible C/A code phase offsets and carrier frequencies differences between all of the GPS satellites and the GPS receiver 10. The replica memory section 130 provides a correlator reset $C_R$ signal for simulated one millisecond time period to the GPS memory comparator 140. Preferably, the replica memory section 130 uses random access memory (RAM) having data which can be downloaded from the microprocessor system ($\mu$P) 32, read only memory (ROM) having precomputed data, or a combination. The GPS memory comparator 140 uses the high frequency clock $F_{HS}$ for comparing data for the incoming GPS signal DM_SIG from the signal memory section 120 to data for locally stored replicas of the GPS signal $D_{M\_LOC}$. An acquisition detection signal $S_c$ for the result is communicated to the replica memory section 130 and the microprocessor system ($\mu$P) 32.

Figure 8:
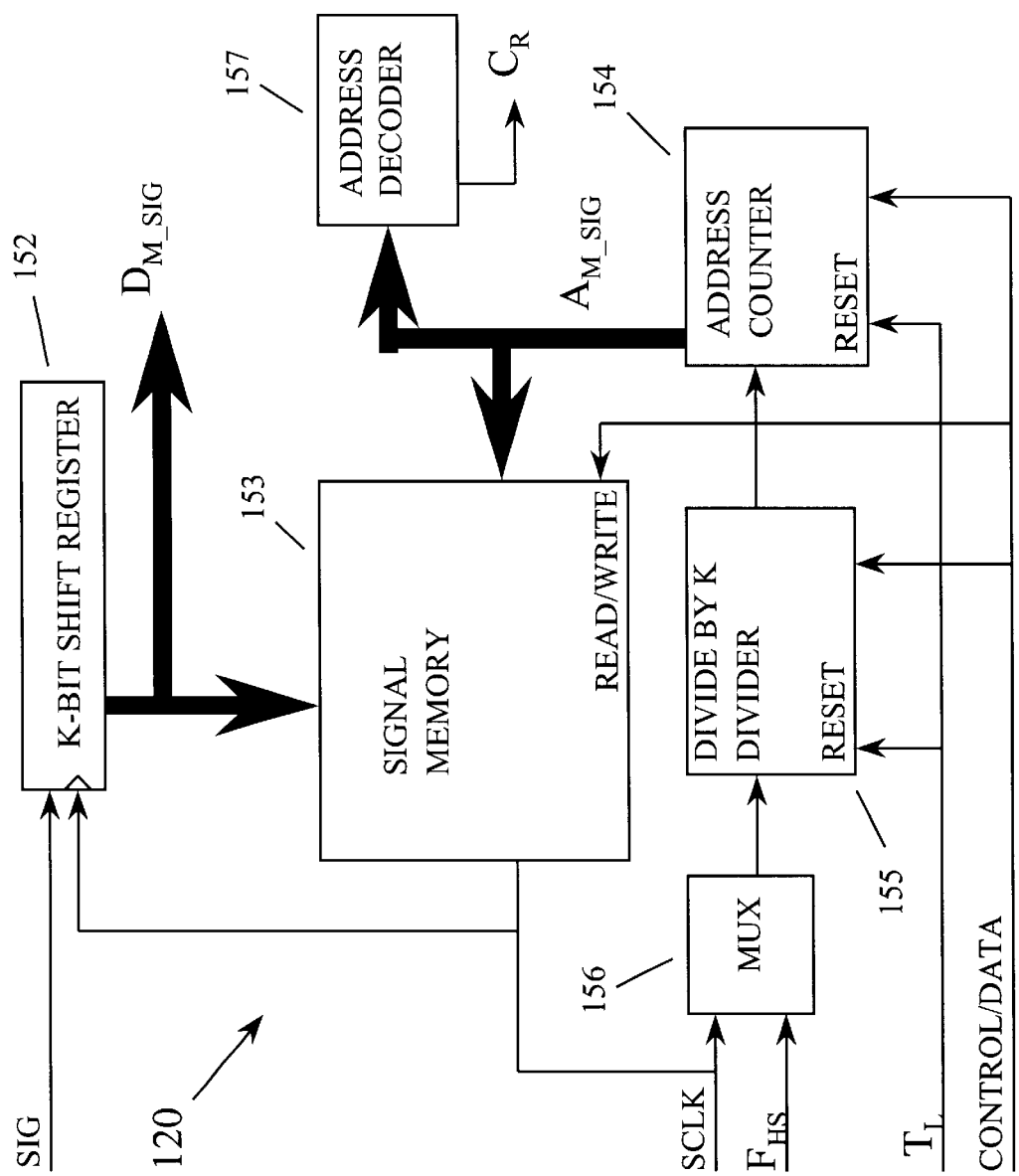
FIG. 8 is a block diagram of a signal memory section of the memory-based search engine of FIG. 7.

FIG. 8 is a block diagram of the signal memory section 120 of the memory-based search engine 30. The signal memory section 120 includes a k-bit shift register 152, a signal memory 153, an address counter 154, a divide-by-k divider 155, a multiplexer (MUX) 156, and an address decoder 157. The samples of the incoming digital GPS signal SIG are written as bits into the shift register 152 at the rate of the sampling clock SCLK. For writing words from the shift register 152 into the signal memory 153 the control/data signal disposes the signal memory 153 to a write mode and controls the multiplexer 156 to pass the sampling clock SCLK to the divide-by-k divider 155. The divide-by-k divider 155 divides the frequency of the sampling clock SCLK by k and passes the 1/k frequency SCLK signal to the address counter 154. The divide-by-k divider 155 and the address counter 154 are reset by the next cycle of the local time signal $T_L$. After being reset, the address counter 154 increments addresses of the signal memory 153 with address signal $A_{M\_SIG}$ on each kth cycle of the sampling clock SCLK. The k-bit words are written from the shift register 152 to the signal memory 153 at each one of the addresses designated by the address signal $A_{M\_SIG}$. The use of the local time signal $T_L$ for synchronizing the divide-by-k divider 155 and the address counter 154 allows the timing of the samples of the digital GPS signal SIG to be known relative to the local reference time. Transferring bits from the shift register 152 for a single period of the local time signal $T_L$, one millisecond in a preferred embodiment, results in a storage requirement for the signal memory 153 of the rate of the sampling clock SCLK, 5.007 megahertz in a preferred embodiment, times 0.001 for 5007 bits. For k equal to thirty-two, a thirty-two bit data bus may be used and one hundred fifty six times thirty-two for 4992 bits will suffice for the capacity of the signal memory 153. The exact number of bits is not critical as the GPS signal power is detected by correlating across many bits, typically greater than or equal to about 5000 bits.

For reading stored GPS signal samples $D_{M\_SIG}$ from the signal memory 153, the control/data signal disposes the signal memory 153 to read mode and controls the multiplexer 156 to pass the high frequency sampling clock $F_{HS}$ to the divide-by-k divider 155. The divide-by-k divider 155 then divides the frequency of the high frequency sampling clock $F_{HS}$ by k and passes the 1/k frequency $F_{HS}$ signal to the address counter 154. The stored GPS signal data $D_{M\_SIG}$ is then passed from the signal memory 153 to the GPS memory comparator 140 as the address counter 154 is incremented at the rate of the high frequency sampling clock $F_{HS}$ divided by k. The address decoder 157 decodes the address signal $A_{M\_SIG}$ to provide the correlator reset signal $C_R$ to the GPS memory comparator 140.

Figure 8A:
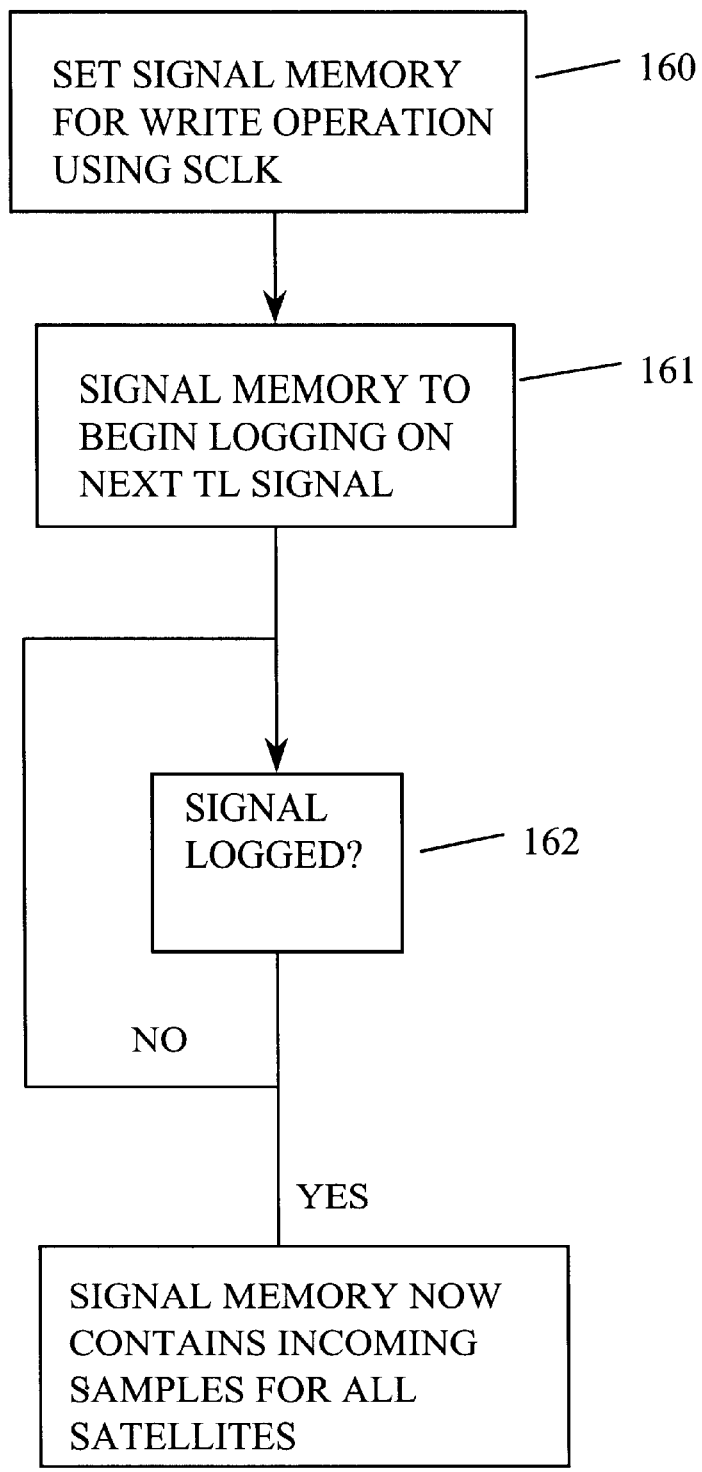
FIG. 8a is a flow chart of the operation of the signal memory section of FIG. 8.

FIG. 8a is a flow chart showing steps of a method for writing the samples of the digitized GPS signal SIG into the signal memory 153. In a step 160 the signal memory 153 is set by the control/data signal from the microprocessor system 32 for a write operation and the multiplexer 156 is controlled to pass the sampling clock SCLK to the signal memory 153 and the divide-by-k divider 155. In a step 161 the address counter 154 and the divide-by-k divider 155 are reset by the local time signal TL and the signal memory 153 begins logging data. In a step 162 the microprocessor system 32 waits while data logging is taking place until the next cycle of the local time signal $T_L$. When data logging is finished the signal memory 153 contains incoming signal data samples for the GPS signal for all the GPS satellites that are received at the antenna 12 (FIG. 1).

Figure 9:
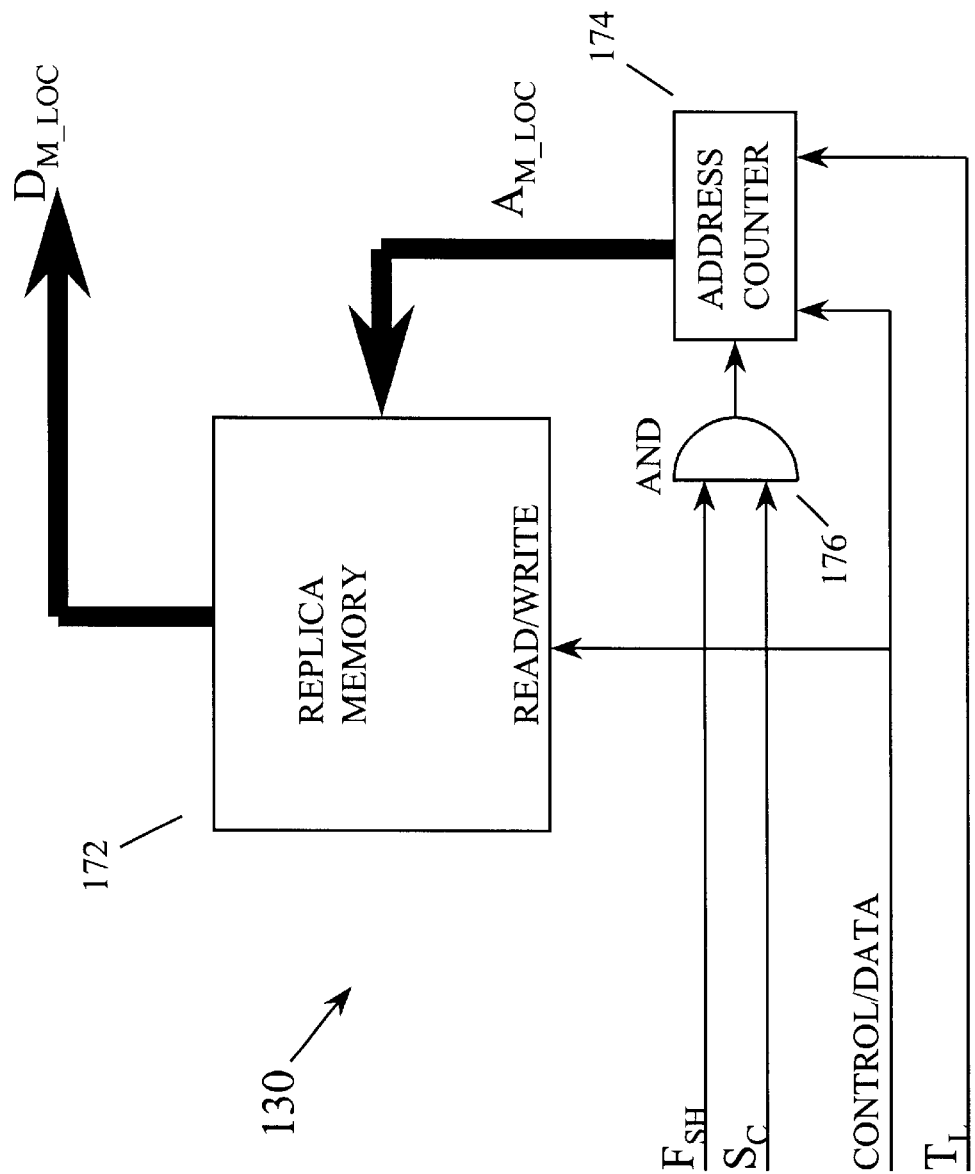
FIG. 9 is a block diagram of a replica memory section of the memory-based search engine of FIG. 7.
Figure 10:
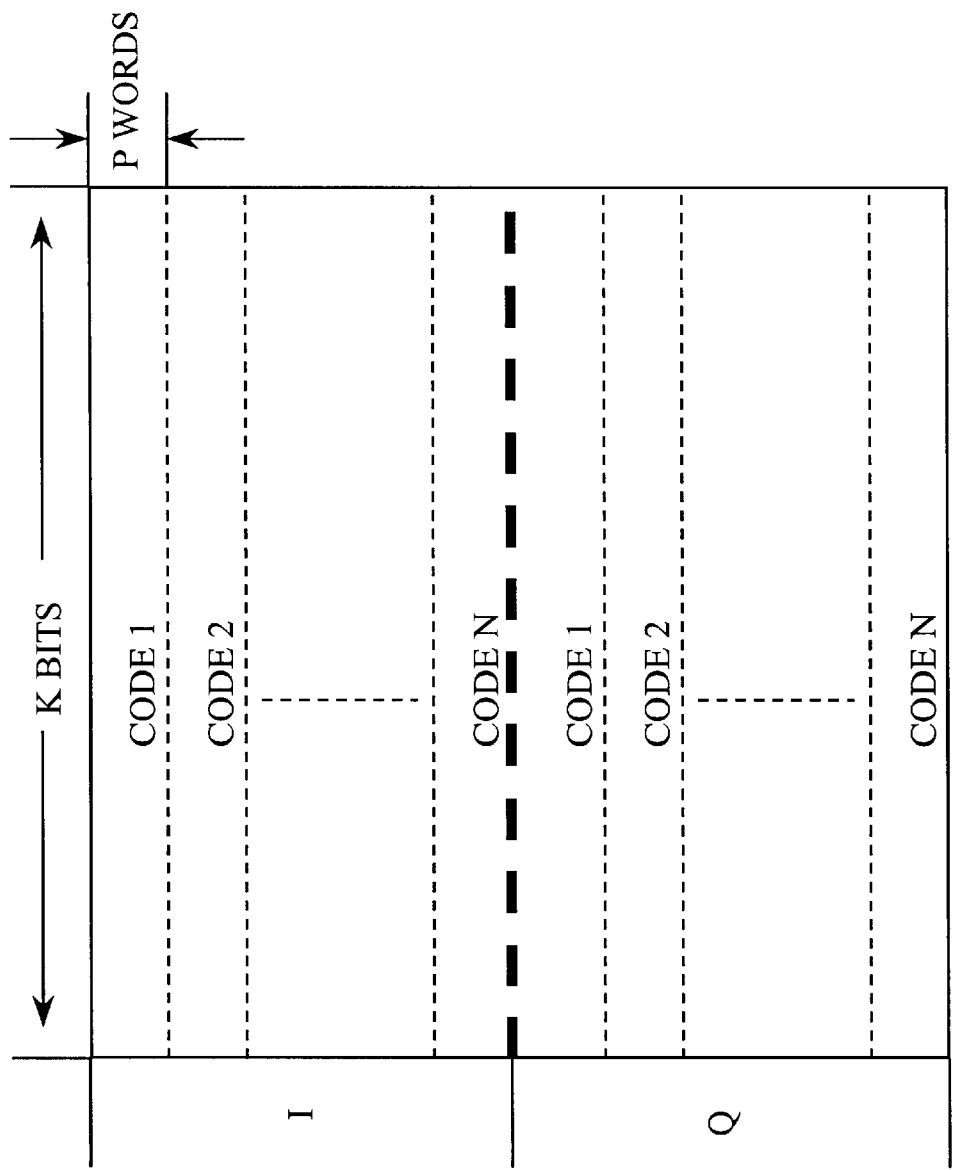
FIG. 10 is a chart illustrating the data that is stored in a replica memory in the replica memory section of FIG. 9.

FIG. 9 is a block diagram of the replica memory section 130 of the memory-based search engine 30. The replica memory section 130 includes a replica memory 172 for storing all possible C/A code phase offsets and carrier frequency differences between each of the GPS satellites and the GPS receiver 10, an address counter 174, and an AND gate 176. The address counter 174 issues an address $A_{M\_LOC}$ for addressing the data $D_{M\_LOC}$ in the replica memory 172. The AND gate 176 is used to allow stopping the address counter 174 via the acquisition detection signal $S_c$. The contents of the replica memory 172 are illustrated in FIG. 10 and described in the accompanying detailed description.

Each of the samples in the replica memory 172 is computed as shown in an equation 1 below.

$$\text{Output sample} = \text{Carrier}_{freq}(t+\phi_1) \times \text{Code}_{prn(t-\phi_2)} \quad (1)$$

In the equation 1, $\text{Carrier}_{freq}(t+\phi_1)$ is the simulated carrier phase at times t (t varies from 0 to one millisecond) with $\phi_1$ equal to either 0° or 90°. $\text{Code}_{prn(t-\phi_2)}$ is the sign of the pseudorandom (PRN) code bit at times t for a given GPS satellite's prn code, offset by a starting phase $\phi_2$. Essentially, all code and carrier phases are simulated in sampled form to determine the sign of each bit in the replica memory 172. This may be done mathematically, as shown in the equation 1, or by simulating numerically controlled oscillators, code generators, etc. It is preferable that the simulated local signals should be sampled at the same rate as the actual signal is sampled, 5.007 megahertz in a preferred embodiment, allowing direct comparison between the two sets of consecutive samples. The replica memory 172 may be loaded from the microprocessor system 32 by placing the replica memory 172 in the write mode and having the microprocessor system 32 reset and clock the address counter 174. Or, the replica memory 172 can be implemented as a read only memory (ROM), pre-loaded with the correct memory configuration.

FIG. 10 is a chart illustrating the data that is stored in the replica memory 172. The carrier frequency difference between the local replica of the GPS carrier and the actual GPS carrier is categorized in terms of frequency bins that are preferably ± five hundred Hertz wide. The code 1, code 2, . . . code N is the data for the prn codes for each of the one through N GPS satellites for each of the code phase increments and frequency bins. The replica memory 172 stores both I and Q replicas for each code 1 to N for each frequency bin in order to insure that power is detected when the replica correlates to the GPS signal. Otherwise, it would be possible to correlate the incoming samples of the GPS signal with a quadrature version of the local carrier resulting in no signal power detected even though the local code phase and carrier frequency match the GPS signal code phase and carrier frequency. The size of the replica memory 172 is calculated from the number of samples by the sampling clock SCLK in one millisecond times two (I and Q samples) times the number of prn codes times the number of prn code phases times the number of frequency bins. For the SCLK frequency of 5.007 megahertz, 32 possible prn codes, 1023 possible code phases and forty frequency bins of ± five hundred Hertz (assuming a possible frequency difference of ± twenty kilohertz between the carrier frequency in the GPS signal and the GPS receiver 10) the size is about thirteen gigabits. However, this size can be reduced in several ways. For example using an almanac to limit the prn codes to about 8, sampling with an SCLK of about one megahertz, using only about 500 code phases, and using ten frequency bins of ± five hundred Hertz results in the replica memory 172 having a size of about eighty megabits.

Figure 11:
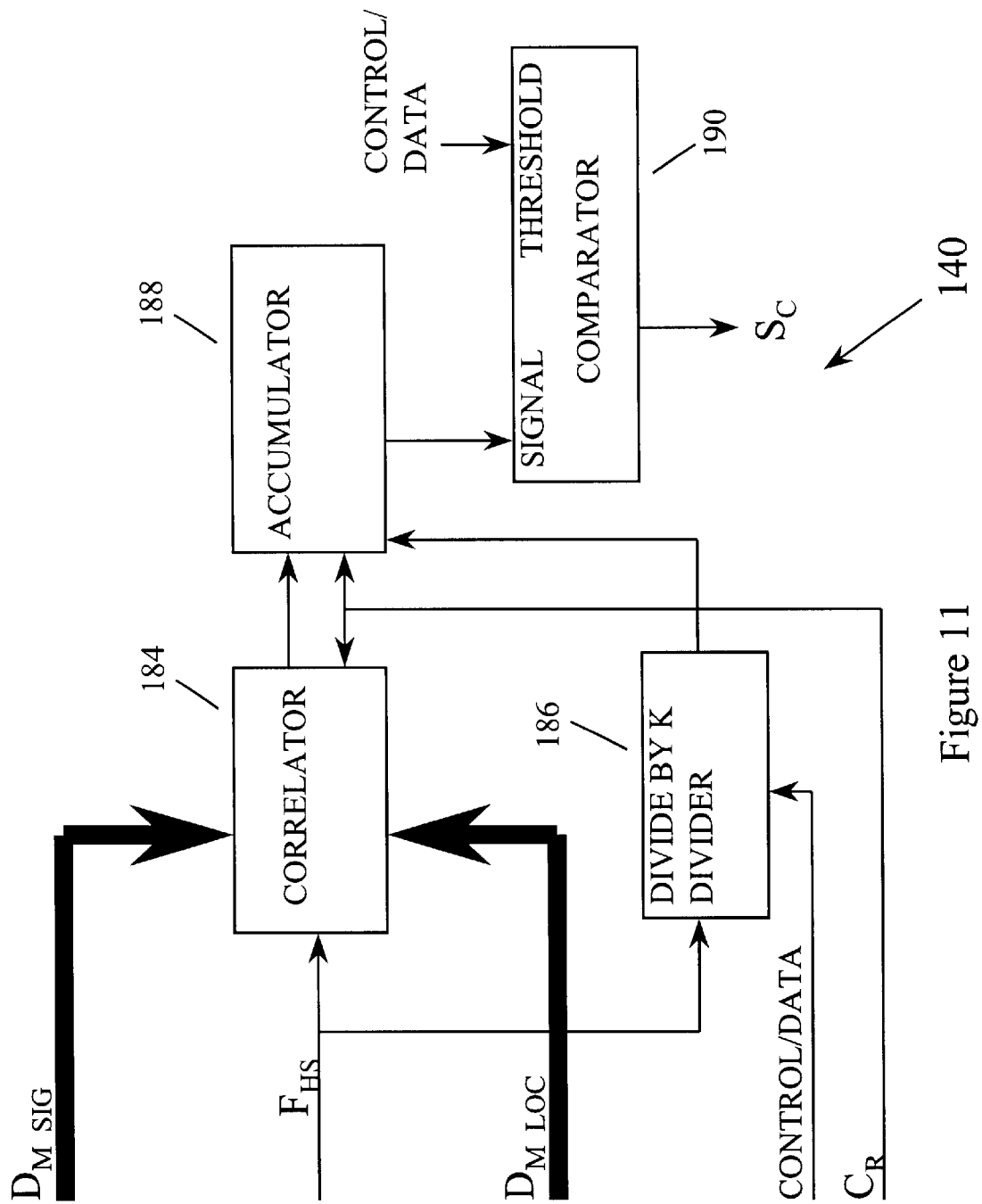
FIG. 11 is a block diagram of a GPS memory comparator of the memory-based search engine of FIG. 7.

FIG. 11 is a block diagram of the GPS memory comparator 140 of the memory-based search engine 30. The GPS memory comparator 140 includes a correlator 184, a divide-by-k divider 186, an accumulator 188, and a threshold comparator 190. The correlator 184 compares the thirty-two bits of data for the GPS signal data $D_{M\_SIG}$ from the signal memory section 120 to the thirty-two bits of data for the locally stored data $D_{M\_LOC}$ from the replica memory section 130 and provides the sum of the positive compares at the rate of the high frequency sampling clock $F_{HS}$ to the accumulator 188. The sums are then accumulated in the accumulator 188 over a simulated one millisecond period by the correlator 184 and the accumulator 188 being reset by the correlator reset signal $C_R$. In effect, the signal memory section 120 is played over and over again. The divide-by-k divider 186 divides the frequency of the high frequency sampling clock $F_{HS}$ by k and provides a clock signal having k times the period of the high frequency sampling clock $F_{HS}$ to the accumulator. The accumulator 188 provides the accumulated sum to the threshold comparator 190. The threshold comparator 190 then compares the accumulated sum to a selected correlation threshold from the microprocessor system 32. The correlation threshold is selected to make a trade-off between minimizing probability that a true acquisition of the GPS signal will be missed and minimizing probability that a false acquisition will be detected. A higher threshold is less likely to yield a false acquisition but more likely to result in missing a true acquisition. When the accumulated sum is greater than the correlation threshold, the threshold comparator 190 issues an acquisition detection signal $S_c$ to the replica memory section 140 and the microprocessor system 32 for indicating that power has been found from the GPS signal. When the acquisition detection signal $S_c$ is set, indicating that power has been found, the address counter 174 (FIG. 9) is stopped and the current address of the address signal $A_{M\_SIG}$ is read by the microprocessor system 32. The microprocessor system 32 includes an executable code for determining the C/A code phase offset and carrier frequency difference between the local and GPS satellite references from the address and passing the information to the C/A code tracking modules 22 for initializing the tracking the GPS satellite.

Figure 11A:
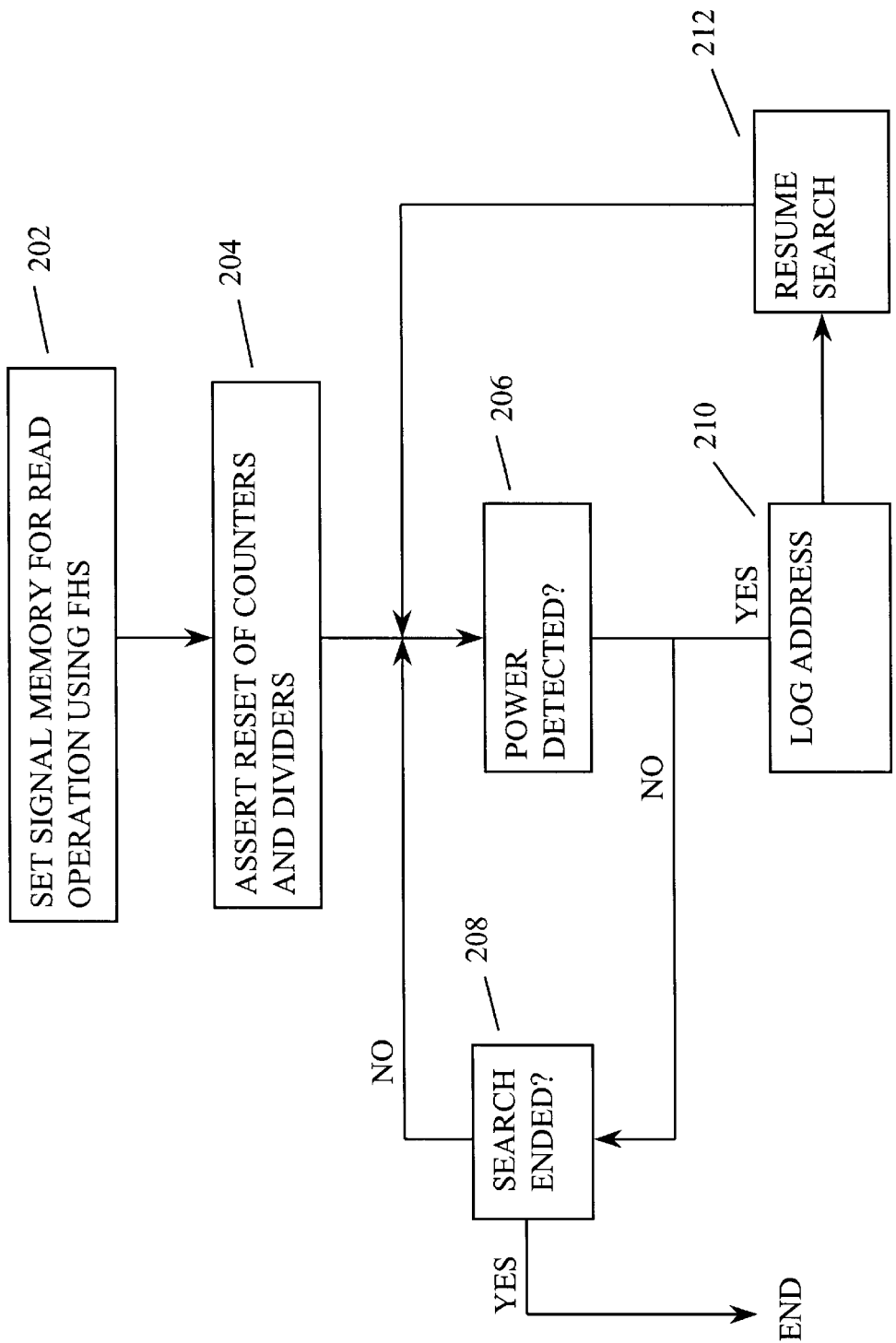
FIG. 11a is a flow chart of the operation of the GPS memory comparator of FIG. 11.

FIG. 11a is a flow chart showing steps of a method for searching the GPS signal and detecting when lock is achieved. In a step 202 the signal memory section 120 is set from the microprocessor system 32 for a read operation and the multiplexer 156 is controlled to pass the high frequency sampling clock $F_{HS}$. In a step 204 the address counter 154, the address counter 174, the divide-by-k divider 155, and the divide-by-k divider 186 are reset. In a step 206 GPS memory comparator 140 compares the incoming GPS signal data $D_{M\_SIG}$ GPS signal to the replica data $D_{M\_LOC}$ and issues the acquisition detection signal $S_c$ indicating whether or not power has been found from the GPS signal. When power has not been detected, the microprocessor system 32 in a step 208 determines whether the search has been ended. When power has been detected, the microprocessor system 32 in a step 210 logs the corresponding address of the replica memory 172. This address of the replica memory 172 contains data for the code phase offset and carrier frequency difference between the GPS receiver and the GPS signal transmitted from the GPS satellite. In a step 212, the microprocessor system 32 directs the memory-based search module 30 to continue searching the GPS signal for as many other GPS satellites as are required. The microprocessor system 32 then uses the address for determining the phase offset and frequency differences for use in initializing the C/A code tracking modules 22.

The invention as described refers to a GPS receiver, however, it is applicable to other receivers including code division multiple access (CDMA) communications receivers. Using an appropriate downconversion scheme with multiple carrier frequencies and a single prn code, it is also applicable to a GLONASS receiver.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver for receiving an incoming signal having a code sequence, comprising:
   a replica memory for storing a plurality of stored replicas having said code sequence starting at a plurality of phase offsets, respectively, of said code sequence; and
   a memory comparator coupled to the replica memory for providing a detection signal when one of said stored replicas matches a representation of said incoming signal.

2. The receiver of claim 1, wherein:
   the replica memory further includes a plurality of said stored replicas starting at one of said phase offsets multiplied by a carrier signal at a plurality of frequencies, respectively, of said carrier signal.

3. The receiver of claim 1, further comprising:
   a signal memory for storing a time period of said incoming signal; and wherein:
      the memory comparator is coupled to the signal memory for comparing said stored replicas against the same said stored time period of said incoming signal and providing said detection signal when said one of said stored replicas matches said incoming signal in said stored time period.

4. The receiver of claim 1, wherein:
   said detection signal is used for acquisition of said incoming signal.

5. The receiver of claim 1, wherein:
   said incoming signal is a global positioning system (GPS) signal.

6. A receiver for receiving an incoming signal having a code sequence, comprising:
   a replica memory for storing a plurality of stored replicas having said code sequence multiplied by a carrier signal at a plurality of frequencies, respectively, of said carrier signal; and
   a memory comparator coupled to the replica memory for providing a detection signal when one of said stored replicas matches a representation of said incoming signal.

7. A receiver for receiving an incoming signal having a code sequence, comprising:
   a replica memory for storing replicas having said code sequence;
   a memory comparator coupled to the replica memory for providing a detection signal when one of said stored replicas matches a representation of said incoming signal; wherein:
      said stored replicas include a first said stored replica starting at a first phase offset of said code sequence and multiplied by a carrier signal having a first frequency, a second said stored replica starting at a second phase offset of said code sequence and multiplied by said carrier signal having said first frequency, a third said stored replica starting at said first phase offset and multiplied by said carrier frequency at a second frequency, and a fourth said stored replica starting at said second phase offset and multiplied by said carrier signal at said second frequency.

8. The receiver of claim 6, further comprising:
   a signal memory for storing a time period of said incoming signal; and wherein:
      the memory comparator is coupled to the signal memory for comparing said stored replicas against the same said stored time period of said incoming signal and providing said detection signal when said one of said stored replicas matches said incoming signal in said stored time period.

9. The receiver of claim 6, wherein:
   said stored replicas are predetermined and stored before storing said incoming signal.

10. A receiver for receiving an incoming signal having a code sequence, comprising:
    a replica memory for storing a plurality of stored replicas of said code sequence multiplied by a carrier signal at a plurality of frequencies, respectively, of said carrier signal; and
    a memory comparator coupled to the replica memory for providing a detection signal when one of said stored replicas matches a representation of said incoming signal; and wherein:
       said incoming signal is a global positioning system (GPS) signal.

11. A method for receiving an incoming signal having a code sequence, comprising steps of:
    storing a plurality of replicas having said code sequence starting at a plurality of phase offsets, respectively, of said code sequence; and
    providing a detection signal when one of said stored replicas matches a representation of said incoming signal.

12. The method of claim 11, wherein:
    the step of storing replicas further includes storing a plurality of said replicas multiplied by a carrier signal at a plurality of frequencies, respectively, of said carrier signal.

13. The method of claim 11, further comprising a step of:
    storing a time period of said incoming signal; and wherein:
       the step of providing a detection signal includes steps of comparing said stored replicas against the same said stored time period of said incoming signal; and providing said detection signal when said one of said stored replicas matches said incoming signal for said stored time period.

14. The method of claim 11, further comprising a step of:

using said detection signal for acquisition of said incoming signal.

15. The method of claim 11, wherein:

said incoming signal is a global positioning system (GPS) signal.

16. A method for receiving an incoming signal having a code sequence, comprising:

storing a plurality of replicas of said code sequence multiplied by a carrier signal at a plurality of frequencies, respectively, of said carrier signal; and providing a detection signal when one of said replicas matches a representation of said incoming signal.

17. A method for receiving an incoming signal having a code sequence, comprising steps of:

storing a plurality of replicas of said code sequence multiplied by a carrier signal at a plurality of frequencies, respectively, of said carrier signal; and providing a detection signal when one of said replicas matches a representation of said incoming signal; wherein:

the step of storing replicas includes storing a first of said replicas starting at a first phase offset of said code sequence and multiplied by a carrier signal having a first frequency; storing a second of said replicas starting at a second phase offset of said code sequence and multiplied by said carrier signal having said first frequency; storing a third of said replicas starting at said first phase offset and multiplied by said carrier frequency at a second frequency; and storing a fourth of said replicas starting at said second phase offset and multiplied by said carrier signal at said second frequency.

18. The method of claim 16, further comprising a step of:

storing a time period of said incoming signal; and wherein:

the step of providing a detection signal includes steps of comparing said replicas against the same said stored time period of said incoming signal; and providing said detection signal when said one of said replicas matches said incoming signal in said stored time period.

19. The method of claim 16, wherein:

said stored replicas are pre-determined and stored before arrival of said incoming signal.

20. The method of claim 16, wherein:

said incoming signal is a global positioning system (GPS) signal.

* * * * *